(12) United States Patent
Wu et al.

(10) Patent No.: US 12,200,594 B2
(45) Date of Patent: Jan. 14, 2025

(54) METHOD AND APPARATUS FOR REDUCING LATENCY IN A COMMUNICATION SYSTEM BY RECONFIGURING A COMMUNICATION DEVICE BASED ON A RECEIVED SIGNALING MESSAGE COMPRISING AN INDICATION OF A FAILURE IN A BACKHAUL LINK

(71) Applicant: LENOVO (BEIJING) LIMITED, Beijing (CN)

(72) Inventors: Lianhai Wu, Beijing (CN); Haiming Wang, Beijing (CN); Jing Han, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 383 days.

(21) Appl. No.: 17/621,373

(22) PCT Filed: Jul. 1, 2019

(86) PCT No.: PCT/CN2019/094272
§ 371 (c)(1),
(2) Date: Dec. 21, 2021

(87) PCT Pub. No.: WO2021/000236
PCT Pub. Date: Jan. 7, 2021

(65) Prior Publication Data
US 2022/0361082 A1    Nov. 10, 2022

(51) Int. Cl.
*H04L 47/74* (2022.01)
*H04W 24/04* (2009.01)
(Continued)

(52) U.S. Cl.
CPC .......... *H04W 40/12* (2013.01); *H04L 47/746* (2013.01); *H04W 24/04* (2013.01);
(Continued)

(58) Field of Classification Search
CPC ... H04L 12/413; H04L 47/728; H04L 47/746; H04W 72/231; H04W 36/305; H04W 72/20; H04W 72/40; H04W 76/18
See application file for complete search history.

(56) References Cited

U.S. PATENT DOCUMENTS

2012/0069790 A1* 3/2012 Chung .................. H04L 5/0053
                                                      370/329
2016/0198457 A1   7/2016 Chu et al.
(Continued)

FOREIGN PATENT DOCUMENTS

WO    2005011206 A1    2/2005
WO    2015131537 A1    9/2015

OTHER PUBLICATIONS

R1-1901535, "On backhaul link radio link failure handling for IAB", Feb. 25-Mar. 1, 2019, pp. 1-3 (Year: 2019).*
(Continued)

*Primary Examiner* — Salvador E Rivas
(74) *Attorney, Agent, or Firm* — Kunzler Bean & Adamson

(57) ABSTRACT

The present disclosure relates to methods and apparatuses. According to some embodiments of the disclosure, a method includes: transmitting a signaling message to a first node on a backup backhaul route, the signaling message comprising an indication of a failure in a backhaul link including a second node different from the first node.

20 Claims, 12 Drawing Sheets

(51) Int. Cl.
   *H04W 36/30*    (2009.01)
   *H04W 40/12*    (2009.01)
   *H04W 72/20*    (2023.01)
   *H04W 72/40*    (2023.01)
   *H04W 76/18*    (2018.01)
   *H04L 47/726*   (2022.01)
   *H04W 72/231*   (2023.01)

(52) U.S. Cl.
   CPC ......... *H04W 36/305* (2018.08); *H04W 72/20* (2023.01); *H04W 72/40* (2023.01); *H04W 76/18* (2018.02); *H04L 47/728* (2013.01); *H04W 72/231* (2023.01)

(56) References Cited

U.S. PATENT DOCUMENTS

| | | | |
|---|---|---|---|
| 2018/0124677 A1* | 5/2018 | He | H04W 40/34 |
| 2018/0139759 A1* | 5/2018 | Park | H04W 74/004 |
| 2021/0195675 A1* | 6/2021 | Park | H04W 24/00 |
| 2021/0266887 A1* | 8/2021 | Zhang | H04L 5/0053 |
| 2021/0352607 A1* | 11/2021 | Miao | H04W 56/0045 |

OTHER PUBLICATIONS

International Searching Authority, "Written Opinion of the International Searching Authority," PCT/CN2019/094272, Mar. 27, 2020, pp. 1-4.

\* cited by examiner

800A

800B

METHOD AND APPARATUS FOR REDUCING LATENCY IN A COMMUNICATION SYSTEM BY RECONFIGURING A COMMUNICATION DEVICE BASED ON A RECEIVED SIGNALING MESSAGE COMPRISING AN INDICATION OF A FAILURE IN A BACKHAUL LINK

TECHNICAL FIELD

The present disclosure generally relates to wireless communication technology, and more particularly to latency reduction in a wireless communication system.

BACKGROUND

A communication link can be established in a wireless communication system to provide service(s) (e.g. voice, data, or other(s)) to a communication device. However, the communication link may fail due to various factors. When a link failure is detected, the communication device can request for reestablishment of communication link, either the previous communication link or a new communication link. The way of reestablishing communication link can include, for example, performing a reestablishment procedure with a Base Station (BS), to keep continuity of the service(s). However, the reestablishment procedure(s) on a market now can be time-consuming and may cause latency in the wireless communication system.

SUMMARY OF THE DISCLOSURE

Some embodiments of the present disclosure provides a method, including: transmitting a signaling message to a first node on a backup backhaul route, the signaling message comprising an indication of a failure in a backhaul link including a second node different from the first node.

Another embodiment of the present disclosure provides a method, including: receiving a signaling message comprising an indication of a failure in a backhaul link.

Yet another embodiment of the present disclosure provides a method, including: receiving, from a base station, configuration information comprising information indicating at least one candidate route for a communication device.

Yet another embodiment of the present disclosure provides a method, including: transmitting, from a base station, configuration information comprising information indicating at least one candidate route for a communication device.

Yet another embodiment of the present disclosure provides a method, including: transmitting, from a communication device, a Pre-emptive Buffer Status Report (Pre-BSR) to at least one parent node after transmitting a uplink grant Yet another embodiment of the present disclosure provides an apparatus. According to some embodiments of the present disclosure, the apparatus includes: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions are configured to, with the at least one processor, to cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

A new solution is required to reduce latency in wireless communication systems.

Figure 1:
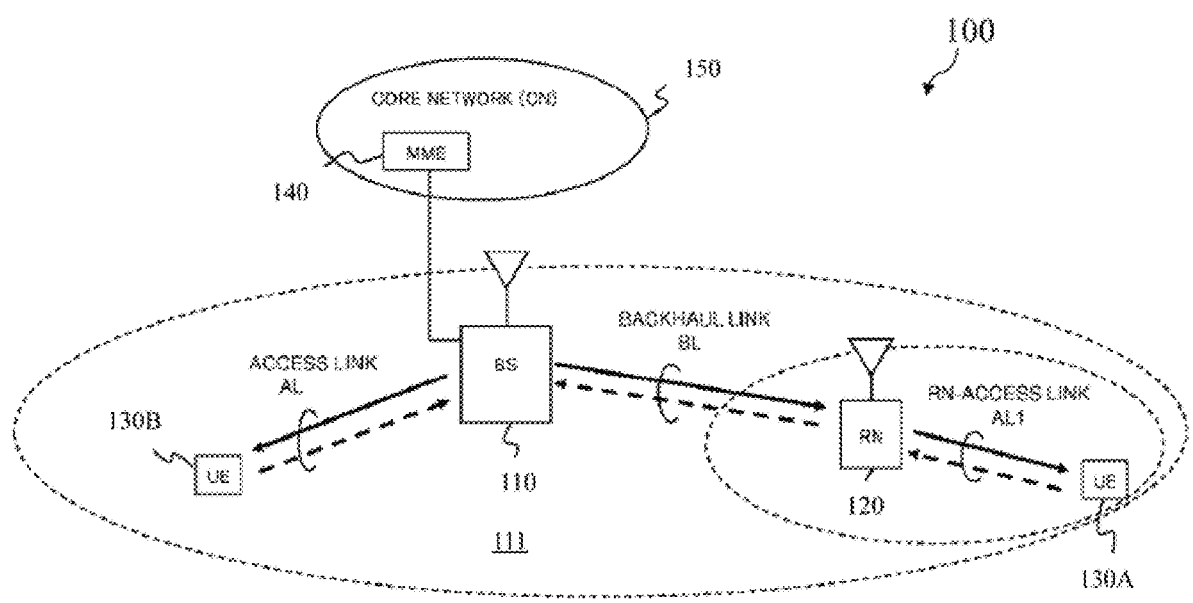
FIG. 1 illustrates a schematic wireless communication system according to some embodiments of the present disclosure.

FIG. 1 illustrates a wireless communication system 100 according to some embodiments of the present disclosure.

Referring to FIG. 1, a wireless communication system 100 may include some nodes (e.g., BS 110 and RN 120) and some UEs (e.g., UE 130A and UE 130B). Although, for simplicity, merely two nodes are illustrated in FIG. 1, it is contemplated that wireless communication system 100 may also include more or fewer nodes in some other embodiments of the present disclosure. Although, for simplicity, merely two UEs are illustrated in FIG. 1, it is also contemplated that wireless communication system 100 may include more or fewer UEs in some other embodiments of the present disclosure.

The BS 110, which communicates with a Core Network (CN) 150, may operate or work under the control of a Mobility Management Entity (MME) 140. The core network may include a Home Subscriber Server (HSS) (not illustrated in FIG. 1), which is communicatively coupled with the MME. The BS 110 may operate, for example based on a standard protocol such as Long-Term Evolution (LTE), LTE-Advanced (LTE-A), New Radio (NR), or other suitable protocol(s). For example, the BS 110 may include an eNB or a gNB, and may define one or more cells (e.g., cell 111). The RN 120 may include a relay node or an integrated access and backhaul node (IAB node). The UE 130A may include, for example, but is not limited to, a computing device, a wearable device, a mobile device, an IoT device, etc. The UE 130B may include a device that is the same or similar to the UE 130A. The UE 130B may also include a device different from the UE 130A. Persons skilled in the art should understand that as technology develops and advances, the terminologies described in the present disclosure may change, but should not affect or limit the principles and spirit of the present disclosure.

The BS 110 (or a Donor BS) may establish radio connections with the UE 130B and the RN 120 through an Access Link (AL) and a Backhaul Link (BL) based on protocol Layer-1 (Physical Layer) to Layer-3 (Radio Resource Control (RRC) Layer), respectively.

In some embodiments of the present disclosure, the RN 120 may establish a radio connection with the UE 130A through an RN-access link (AL1) based on protocol Layer-1 to Layer-3. In some other embodiments of the present disclosure, the RN 120 may establish a radio connection with the UE 130A through the AL1 based on protocol Layer-1 to Layer-2.

Although FIG. 1 merely shows that the Donor BS 110 is connected to a single UE for simplicity, it is contemplated that the Donor BS 110 may provide or establish connections with multiple UEs. Similarly, although FIG. 1 merely shows that the RN 120 is connected to a single UE for simplicity, it is contemplated that the RN 120 may also provide or establish connections with multiple UEs.

Deployment of RN(s) helps to enhance and/or extend coverage of a BS by a backhaul link. Evolved Universal Terrestrial Radio Access Network (E-UTRAN) supports relaying by having an RN wirelessly connect to an eNB serving the RN, called Donor eNB (DeNB), via a modified version of the Evolved Universal Terrestrial Radio Access (E-UTRA) radio interface, i.e., the BL, also referred to as the Un interface. The radio interface that provides radio protocol connection between RN and the UE is referred to as the Uu interface. Relay function and use of RN/DeNB entities in a network is transparent to the operations of the connected UEs.

3GPP is envisioning an IAB architecture for 5G (NR) communication networks supporting multi-hop relays. In other words, an IAB node may hop through one or more IAB nodes before reaching the IAB Donor. A single hop may be considered a special instance of multiple hops. Multi-hop backhauling is relatively beneficial because it provides a relatively greater coverage extension compared to single-hop backhauling. In a relatively high frequency radio communication system (e.g., radio signals transmitted in frequency bands over 6 GHz), relatively narrow or less signal coverage may benefit from multi-hop backhauling techniques. Multi-hop backhauling further enables backhauling around obstacles (e.g., buildings in urban environments for in-clutter deployments).

Figure 2:
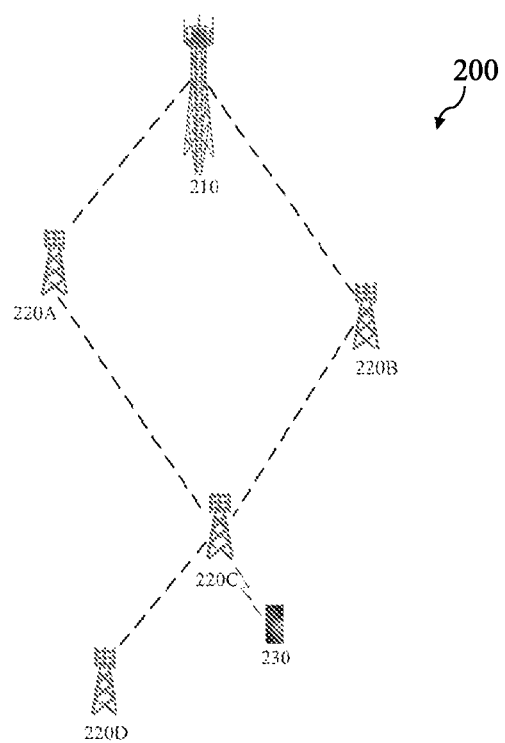
FIG. 2 illustrates a schematic wireless communication system according to some embodiments of the present disclosure.

FIG. 2 illustrates a wireless communication system 200 according to some embodiments of the present disclosure.

Referring to FIG. 2, the wireless communication system 200 can include a Donor node (e.g., IAB Donor 210), some IAB nodes (e.g., IAB node 220A, IAB node 220B, IAB node 220C, and IAB node 220D), and some UEs (e.g., UE 230). Although merely one Donor node is illustrated in FIG. 2 for simplicity, it is contemplated that a wireless communication system 200 may include more Donor node(s) in some other embodiments of the present disclosure. Similarly, although merely four IAB nodes are illustrated in FIG. 2 for simplicity, it is contemplated that the wireless communication system 200 may include more or fewer IAB nodes in some other embodiments of the present disclosure. Although merely one UE is illustrated in FIG. 2 for simplicity, it is contemplated that the wireless communication system 200 may include more or fewer UEs in some other embodiments of the present disclosure.

Although IAB node 220A and IAB node 220B are connected to the same Donor node, i.e., IAB Donor 210, in FIG. 2, IAB node 220A and IAB node 220B may be connected to different Donor nodes in accordance with some embodiments of the present disclosure.

In the wireless communication system 200, multi-connectivity may be configured for one or more IAB nodes. Dual-connectivity may be considered a special instance of multi-connectivity. For example, as shown in FIG. 2, the IAB node 220C may be connected to more than one parent IAB nodes, including the IAB node 220A and the IAB node 220B. In other words, the IAB node 220A and the IAB node 220B share a child IAB node, e.g., the IAB node 220C. In this scenario, the IAB node 220C would have a plurality of routes to the Donor node, e.g., the IAB Donor 210, via a plurality of parent JAB nodes, e.g., the IAB node 220A and the IAB node 220B. For example, the IAB node 220C can reach the IAB Donor 210 by hopping through the IAB node 220A (route A: IAB Donor 210↔IAB node 220A↔IAB node 220C). Alternatively, the IAB node 220C can reach the IAB Donor 210 by hopping through the IAB node 220B (route B: JAB Donor 210↔IAB node 220B↔IAB node 220C). From the perspective of the downstream nodes of the IAB node 220C, e.g., the IAB node 220D, the IAB node 220D also has plurality of routes to the IAB Donor 210 via the IAB node 220C. Please note that multi-connectivity may also be configured for one or more other IAB nodes in the wireless communication system.

In some embodiments of the present disclosure, two or more routes of a plurality of routes from an IAB node to an IAB Donor may be active. For example, referring to FIG. 2, at JAB node 220C, both route A and route B may be active. In other words, JAB node 220C may transmit or receive data on both route A and route B at the same time.

In some embodiments of the present disclosure, only one route of a plurality of routes from an JAB node to an JAB Donor may be active, and the remaining routes of the plurality of routes may be in a backup state. For example, referring to FIG. 2, at the JAB node 220C, route A (JAB Donor 210↔JAB node 220A↔JAB node 220C) may be active, but route B (JAB Donor 210↔JAB node 220B↔JAB node 220C) may be in a backup state. In other words, the JAB node 220C may be connected to the JAB node 220B, but there may be no data communication (e.g. data transmission or receiving) on route B at that time. In this scenario, route B may be referred to as a backup route of the JAB node 220C, and the JAB node 220B may be referred to as a backup parent node of the JAB node 220C.

When a Radio Link Failure (RLF) occurs on the backhaul link, e.g. between the JAB node 220A and the JAB node 220C, the JAB node 220C may autonomously switch to the backup route or select a backup parent node, e.g. the JAB node 220B. The backup route can help the JAB node 220C to promptly switch to a backup parent node to continue service providing, and reduce latency resulted from reestablishment of communication link (or route change).

Figure 3:
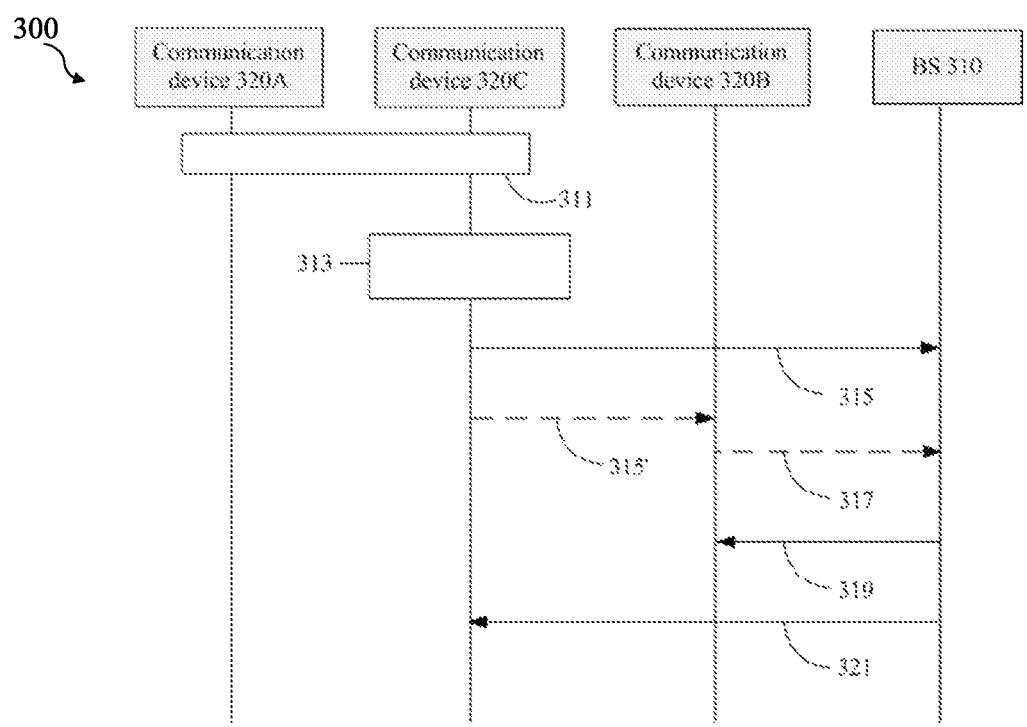
FIG. 3 illustrates a flow chart of an exemplary procedure of handling radio link failure according to some embodiments of the present disclosure.

FIG. 3 illustrates a flow chart of an exemplary procedure 300 for handling radio link failure according to some embodiments of the present disclosure.

In FIG. 3, a multi-connectivity may be configured for a communication device 320C. For example, the communication device 320C may be connected to more than one parent nodes, e.g. a communication device 320A and a communication device 320B. In some embodiments of the present disclosure, the radio link between communication the device 320C and the communication device 320A may be in an active state, and the radio link between the communication device 320C and the communication device 320B may be in a backup state. The communication device 320B may be connected to the BS 310. The communication device 320A may also be connected to the BS 310 or may be connected to a different BS (not illustrated in FIG. 3). The route from the communication device 320C to the BS 310 via the communication device 320B may be referred to as a backup route of the communication device 320C.

The communication device 320A may function as the IAB node 220A shown in FIG. 2, the communication device 320B may function as the IAB node 220B shown in FIG. 2, the communication device 320C may function as the IAB node 220C shown in FIG. 2, and the BS 310 may function as the IAB Donor 210 shown in FIG. 2.

In operation 311, a RLF may occur on a radio link between the communication device 320C and the communication device 320A.

As mentioned above, the communication device 320C may be connected to both the communication device 320A and the communication device 320B. In this scenario, there are at least two protocol stacks at the communication device 320C, for example, one protocol stack corresponding to the communication device 320A, and another protocol stack corresponding to the communication device 320B. Each protocol stack may include, for example, a Packet Data Convergence Protocol (PDCP) layer, a Radio Link Control (RLC) layer, a Medium Access Control (MAC) layer, and a Physical layer (PHY). Each layer of the protocol stack may include corresponding buffer(s), for example, a transmitting buffer, a receiving buffer, or both.

In operation 313, the communication device 320C may forward information associated with the failed radio link (i.e., the radio link between the communication device 320C and the communication device 320A) from one protocol stack that corresponds to the communication device 320A to another protocol stack that corresponds to the communication device 320B.

In some embodiment of the present disclosure, the information associated with the failed radio link may include pending data in the buffer(s) of the protocol stack corresponding to the communication device 320A. Pending data may include, for example, but is not limited to, PDCP packets that have been successfully transmitted. In some embodiment of the present disclosure, information associated with the failed radio link may include assistant information such as PDCP status report. A PDCP status report may indicate, for example, but is not limited to, packets that have been successfully transmitted, packets that have been successfully received, packets that have not been successfully transmitted, packets that have not been successfully received, or any combination thereof.

In operation 315, the communication device 320C may transmit a signaling message (e.g., a RRC signaling message) to a BS (e.g., the BS 310) on a backup route of the communication device 320C. The signaling message may include an indication of a failure in the radio link between the communication device 320C and the communication device 320A.

In some embodiments of the present disclosure, the indication of a failure in a radio link may be transmitted during a random access procedure. During a random access procedure described in 3GPP specification TS 38.300, a communication device may transmit connection reestablishment request to a BS via a RRC signaling message included in Msg3. In some embodiments of the present disclosure, the indication of failure in the radio link may be transmitted via such signaling message (e.g., connection reestablishment request).

In some embodiments of the present disclosure, indication of failure in radio link may be transmitted after a successful random access procedure. For example, the indication of the failure in the radio link may be transmitted after the transmission of a connection reestablishment complete message.

In some embodiments of the present disclosure, the operation 315 can be replaced by an operation 315' (denoted by dotted line) and an operation 317 (denoted by dotted line).

For example, the communication device 320C may not perform the operation 315 but instead perform the operations 315' and 317. In the operation 315', the communication device 320C may transmit a signaling message to a communication device (e.g. the communication device 320B) on a backup route of the communication device 320C. The signaling message may include an indication of failure in a radio link between the communication device 320C and the communication device 320A. In some embodiments of the present disclosure, the signaling message may include a MAC Control Element (CE) signaling message.

In operation 317, the communication device 320B may transmit the indication of failure in the radio link to BS 310.

In an operation 319, the BS 310 may reconfigure the communication device 320B. In operation 321, the BS 310 may reconfigure the communication device 320C. In some embodiments of the present disclosure the BS 310 may transmit reconfiguration messages to the communication device 320B and the communication device 320C, respectively. For example, the reconfiguration messages may be used to update routing tables at the communication device 320B and the communication device 320C. In some embodiments of the present disclosure the BS 310 may configure User Equipment (UE) Data Radio Bearer (DRB) information for communication device 320B.

In some embodiments of the present disclosure, the communication device 320A and the communication device 320B may be connected to a different BSs. In these embodiments, a BS (not shown in FIG. 3) serving the communication device 320A may forward information associated with the communication device 320C to a BS (e.g., the BS 310) serving the communication device 320B. In some embodiments, the information associated with the communication device 320C may include data (e.g., PDCP packet(s)) that has not been acknowledged by the communication device 320C. In some embodiments, the information associated with the communication device 320C may include assistant information such as PDCP status report.

Figure 3A:
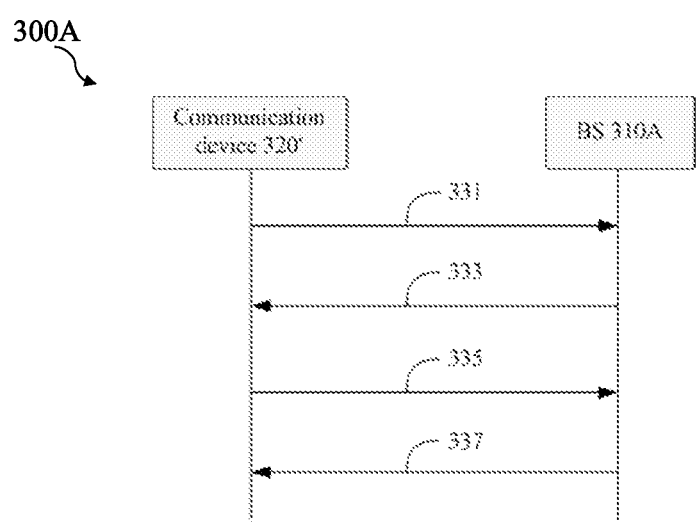
FIG. 3A illustrates a flow chart of an exemplary procedure of random access procedure according to some embodiments of the present disclosure.

FIG. 3A illustrates a flow chart of an exemplary procedure 300A of random access procedure according to some embodiments of the present disclosure. The procedure 300A may occur, for example, in response to a RLF at a communication device (e.g., communication device 320'), which may attempt to re-establish a new link.

In operation 331, the communication device 320' may transmit a random access preamble on a Random Access Channel (RACH) to a BS (e.g., the BS 310A). The preamble may be selected from two or more preamble groups based on the size of a subsequent message (e.g., Msg3) and a threshold. Information associated with the preamble groups and the threshold may be broadcast in system information.

In response to the random access preamble, the BS 310A may allocate resources such as new Cell Radio Network Temporary Identifier (C-RNTI) and Signaling Radio Bearer 1 (SRB 1) configuration for the communication device 320'. In operation 333, the BS 310A may transmit a Random Access Response (RAR) message to the communication device 320'. The RAR message may include a Time Advance (TA), a UL grant, and other information. The TA can be used to adjust the transmit timing of the communication device 320'.

In operation 335, the communication device 320' may transmit a message (e.g., Msg3) to the BS 310A. Msg3 may include an RRC Connection Re-establishment Request generated by the RRC layer of the communication device 320'.

In operation 337, the BS 310A may transmit contention resolution to the communication device 320'. In some embodiments of the present disclosure, an early contention resolution may be used. In other words, the BS 310A may not wait for Non-Access Stratum (NAS) reply before resolving a contention.

Figure 4:
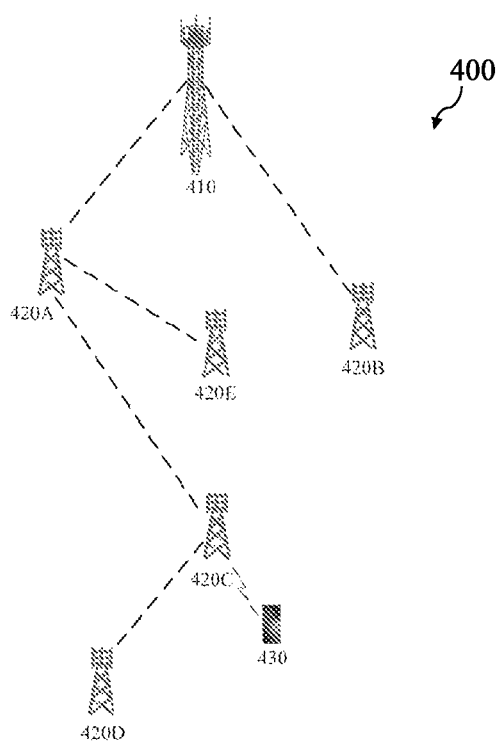
FIG. 4 illustrates a schematic wireless communication system according to some embodiments of the present disclosure.

FIG. 4 illustrates a wireless communication system 400 according to some embodiments of the present disclosure.

Referring to FIG. 4, a wireless communication system 400 can include a Donor node, e.g. an IAB Donor 410, some IAB nodes, e.g., an IAB node 420A, an IAB node 420B, an IAB node 420C, an IAB node 420D, and an IAB node 420E), and some UEs, e.g. a UE 430. Although merely one Donor node is illustrated in FIG. 4 for simplicity, it is contemplated that the wireless communication system 400 may include more Donor node(s) in some other embodiments of the present disclosure. Similarly, although merely five IAB nodes are illustrated in FIG. 4 for simplicity, it is contemplated that the wireless communication system 400 may include more or fewer IAB nodes in some other embodiments of the present disclosure. Although merely one UE is illustrated in FIG. 4 for simplicity, it is contemplated that the wireless communication system 400 may include more or fewer UEs in some other embodiments of the present disclosure.

In FIG. 4, the IAB node 420A and the IAB node 420B are directly connected to the IAB Donor 410. The IAB node 420C and the IAB node 420E can reach the IAB Donor 410 by hopping through IAB node 420A. The IAB node 420D can reach the IAB Donor 410 by hopping through the IAB node 420C and the IAB node 420A. The UE 430 is directly connected to the IAB node 420C.

Each of the IAB node 420A, the IAB node 420B, the IAB node 420C, the IAB node 420D and the IAB node 420E may be directly connected to one or more UE(s) in accordance with some other embodiments of the present disclosure. Each of the IAB node 420A, the IAB node 420B, the IAB node 420C, the IAB node 420D and the IAB node 420E may be directly connected to one or more IAB node(s) in accordance with some other embodiments of the present disclosure.

In FIG. 4, when a RLF occurs on a backhaul link between the IAB node 420A and the IAB node 420C, the IAB node 420C may need to select a suitable node (or a suitable parent node) to reestablish the backhaul link. However, this process may sometimes take relatively great time, which will cause latency in the wireless communication system.

One solution to reduce such latency may include configuring candidate route(s) for the IAB node 420C. For example, the IAB donor 410 may configure a candidate route for the IAB node 420C (e.g., candidate route: IAB donor 410↔IAB node 420B↔IAB node 420C, which is not denoted in FIG. 4). In the case that a RLF occurs on the backhaul link between the JAB node 420A and the JAB node 420C, the JAB node 420C can autonomously switch to the candidate parent node (e.g., the JAB node 420B) associated with the candidate route, thereby saving time for route change.

Figure 5:
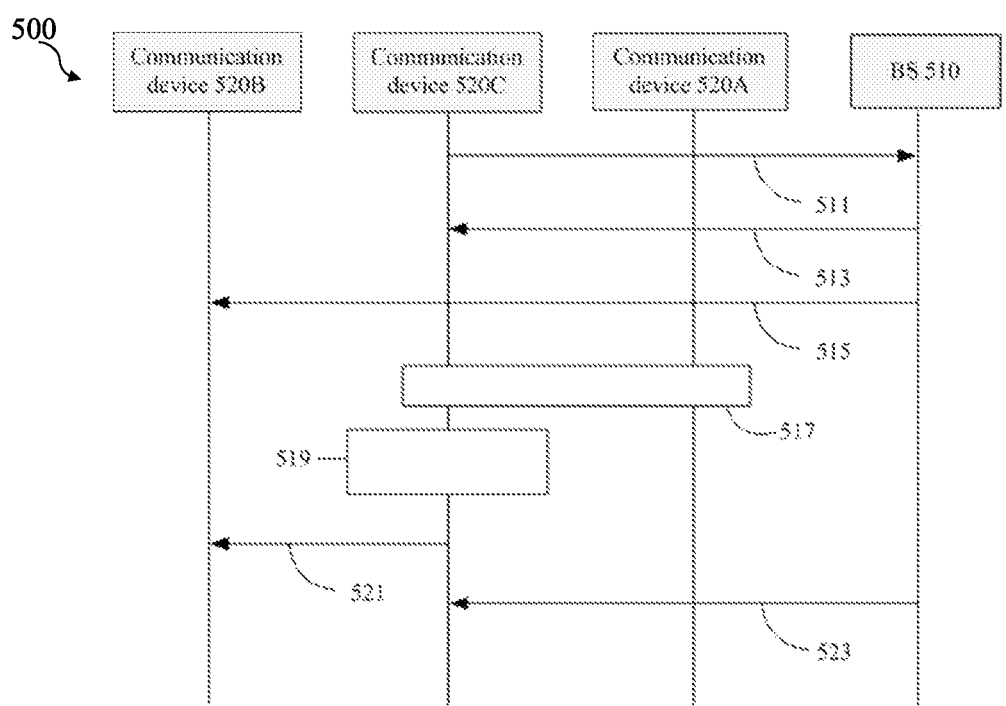
FIG. 5 illustrates a flow chart of an exemplary procedure of handling radio link failure according to some embodiments of the present disclosure.

FIG. 5 illustrates a flow chart of an exemplary procedure 500 of handling a radio link failure according to some embodiments of the present disclosure.

In FIG. 5, a communication device 520C can reach a BS 510 by hopping through a communication device 520A. The communication device 520B may be connected to the BS 510 or may be connected to a different BS (not illustrated in FIG. 5).

The communication device 520A may function as the JAB node 420A shown in FIG. 4, the communication device 520B may function as the JAB node 420B or the JAB node 420E shown in FIG. 4, the communication device 520C may function as the JAB node 420C shown in FIG. 4 and the BS 510 may function as the JAB Donor 410 shown in FIG. 4.

In operation 511, the communication device 520C may transmit measurement result report to the BS 510. Based on the measurement result report, the BS 510 may determine at least one candidate route that the communication device 520C can use to reestablish communication.

In operation 513, the BS 510 may transmit configuration information to the communication device 520C. In some embodiments of the present disclosure, configuration information may include information indicating the at least one candidate route for the communication device 520C.

In some embodiments of the present disclosure, the information indicating the at least one candidate route may include information identifying a respective candidate parent node(s) associated with each of the at least one candidate route. In some embodiments of the present disclosure, the information indicating the candidate parent node may include an identity of the candidate parent node and a TA associated with the candidate parent node. For example, the BS 510 may transmit an identity of the communication device 520B and the TA associated with the communication device 520B to the communication device 520C. The identity of a communication device may be a cell identity of the communication device (e.g., a Physical Cell Identity (PCI)), a Cell Radio Network Temporary Identifier (C-RNTI), or any other ID(s) that can be used to identify the communication device.

The BS 510 may transmit UE context associate with the communication device 520C to each candidate parent node of communication device 520C. For example, in operation 515, the BS 510 may transmit UE context associated with the communication device 520C to the communication device 520B.

Referring back to FIG. 4, the IAB Donor 410 may transmit at least one candidate route for the IAB node 420C for re-establishing a new link if an RLF occurs on the IAB node 420C. The IAB Donor 410 may also transmit the UE context of IAB node 420C to each of the at least one candidate parent nodes.

In some embodiments, the IAB Donor 410 may determine that route C (IAB donor 410↔IAB node 420B↔IAB node 420C) can be qualified as a candidate route. The at least one candidate route may thus include route C and the candidate parent node associated with the candidate route can be IAB node 420B. The IAB Donor 410 may transmit an identity of the IAB node 420B and a TA associated with the IAB node 420B to the IAB node 420C. The IAB Donor 410 may also transmit the UE context of the IAB node 420C to the IAB node 420B.

In some embodiments, the IAB Donor 410 may determine that route C cannot be qualified as a candidate route, and that route D (IAB donor 410↔IAB node 420A↔IAB node 420E↔IAB node 420C) can be qualified as a candidate route. In these embodiments, the at least one candidate route may include route D and the candidate parent node associated with the candidate route can be the IAB node 420E. The IAB Donor 410 may transmit an identity of the IAB node 420E and a TA associated with the IAB node 420E to the IAB node 420C. The IAB Donor 410 may also transmit the UE context of the IAB node 420C to the IAB node 420E.

In some embodiments the at least one candidate route may include both route C and route D. The IAB Donor 410 may transmit an identity of the IAB node 420B, a TA associated with the IAB node 420B, an identity of IAB node 420E, and a TA associated with IAB node 420E to IAB node 420C. The IAB Donor 410 may transmit the UE context of the IAB node 420C to both the IAB node 420B and the IAB node 420E.

Referring back to FIG. 5, in operation 517, a RLF, which may occur on the radio link between the communication device 520C and the communication device 520A, can be detected.

In operation 519, communication device 520C may select one parent node associated with one of the at least one candidate route for re-establishing a new radio link. For example, the communication device 520C may select the communication device 520B for re-establishing a new radio link.

In operation 521, the communication device 520C may transmit a reestablishment request to the selected parent node (e.g., the communication device 520B) without performing a random access. In some embodiments, the reestablishment request may be transmitted based on the TA associated with the selected parent node configured by the BS 510.

In operation 523, the BS 510, which can be a BS that serves the selected parent node, may transmit acknowledgement to the communication device 520C relayed by the communication device 520B. In other words, the communication device 520B forwards the acknowledgement from the BS 510 to the communication device 520C without decoding it. The communication device 520C may transmit data to its new parent node, e.g., communication device 520B. The communication device 520C may receive data from its new parent node, e.g. the communication device 520B.

In some embodiments of the present disclosure, a number of the candidate routes configured by a BS may equal to 1. In other words, merely one candidate route is configured by the BS. In such condition, the communication device 520C may not need to perform node selection and may directly transmit the reestablishment request to the candidate parent node associated with this candidate route.

In some embodiments of the present disclosure the number of the candidate routes configured by the BS may be greater than 1. In such condition, the communication device 520C may select one of the plurality of the candidate routes based on the following criteria.

The criteria of route selection may include a threshold associated with route selection. For example, a communication device may determine a candidate parent node as a suitable node to reestablish a communication link with if it is determined that the channel quality of the channel between the candidate parent node and the communication device is equal to or greater than the threshold associated with route selection. The threshold of route selection may be configured by a BS (e.g., the BS 510).

The channel quality of a channel may be determined based on at least one or more of the following: Reference Signal Received Power (RSRP), Reference Signal Strength Indicator (RSSI), or Reference Signal Receiving Quality (RSRQ). Other channel quality metrics may also be employed.

The criteria for route selection may also be based on assistant information in the routing table at the communication device. For example, the criteria for route selection may include:
  the number of hops from each candidate parent node to the base station;
  loading information associated with each of the at least one candidate route;
  bit rate associated with each of the at least one candidate route; or
  any combination thereof.

A relatively less hop number can be regarded as a relatively less latency. A candidate route includes less hops can be given priority during route selection. For example, referring back to FIG. 4, both the IAB node 420E and the IAB node 420B can be the candidate parent nodes for the IAB node 420C. The IAB node 420C may select IAB node 420B for reestablishment since the number of hops from the IAB node 420B to the IAB Donor 410 (equals to 1) and is smaller than the number of hops from the IAB node 420E to the IAB Donor 410 (equal to 2).

The loading information associated with a candidate route may refer to the maximum load among the load of respective hops on the candidate route. The loading information associated with the candidate route may present the load status of a candidate route. A relatively less loaded candidate route may be given priority in route selection. A candidate route having relatively less maximum load may be given priority in route selection.

For example, still referring to FIG. 4, the load of the hop between the JAB node 420E and the JAB node 420A may be 70%, the load of the hop between the JAB node 420A and the JAB Donor 410 may be 60%, and the load of the hop between the JAB node 420B and the JAB Donor 410 may be 80%. Thus, the loading information associated with the candidate route, e.g. route C: JAB Donor 410↔JAB node 420A↔JAB node 420E, is 70% (i.e., the maximum of 70% and 60%). The loading information associated with the candidate route, e.g., route D: JAB Donor 410↔JAB node 420B, is 80%. The JAB node 420C may select candidate route C (JAB node 420E) for reestablishment.

The bit rate associated with a candidate route may refer to a minimum bit rate among the bit rates of respective hops on a candidate route. A candidate route having a relatively great minimum bit rate may be given priority in route selection.

For example, referring to FIG. 4, the bit rate of the hop between the JAB node 420E and the JAB node 420A may be 2 Mbps, the bit rate of the hop between the JAB node 420A and the JAB Donor 410 may be 1 Mbps, and the bit rate of the hop between JAB node 420B and JAB Donor 410 may be 1.5 Mbps. Thus, the bit rate associated with the candidate route, e.g. route C: IAB donor 410↔JAB node 420A↔JAB node 420E, is 1 Mbps (e.g., the minimum of 2 Mbps and 1 Mbps). The bit rate associated with the candidate route, e.g. route D: IAB donor 410↔JAB node 420B, is 1.5 Mbps. The JAB node 420C may select the candidate route D (JAB node 420B) for reestablishment.

Other route selection criteria may also be employed. These criteria for route selection may be employed alone or in any combination thereof, depending on, for example, the types of services provided. For example, for voice services, candidate routes having relatively less hop numbers may be given priority in route selection. For video services, candidate routes having relatively great bit rates may be given priority in route selection. For virtual reality services, candidate routes having relatively less hop numbers and relatively great bit rates may be given priority in route selection In a single-hop communication system, a communication device may transmit a Scheduling Request (SR) to a BS when it has UL data to transmit. In response, the communication device may receive, from the BS, a grant for UL transmission. Thereafter, the communication device may transmit UL data. This process is hereinafter referred to as UL scheduling.

In a multi-hop communication system, when a communication device has UL data to transmit, an UL scheduling may be performed on each of the upstream nodes of the communication device. The UL scheduling procedure in a multi-hop communication system will be described in detail in the following text with respect to FIGS. 6 and 7.

Figure 6:
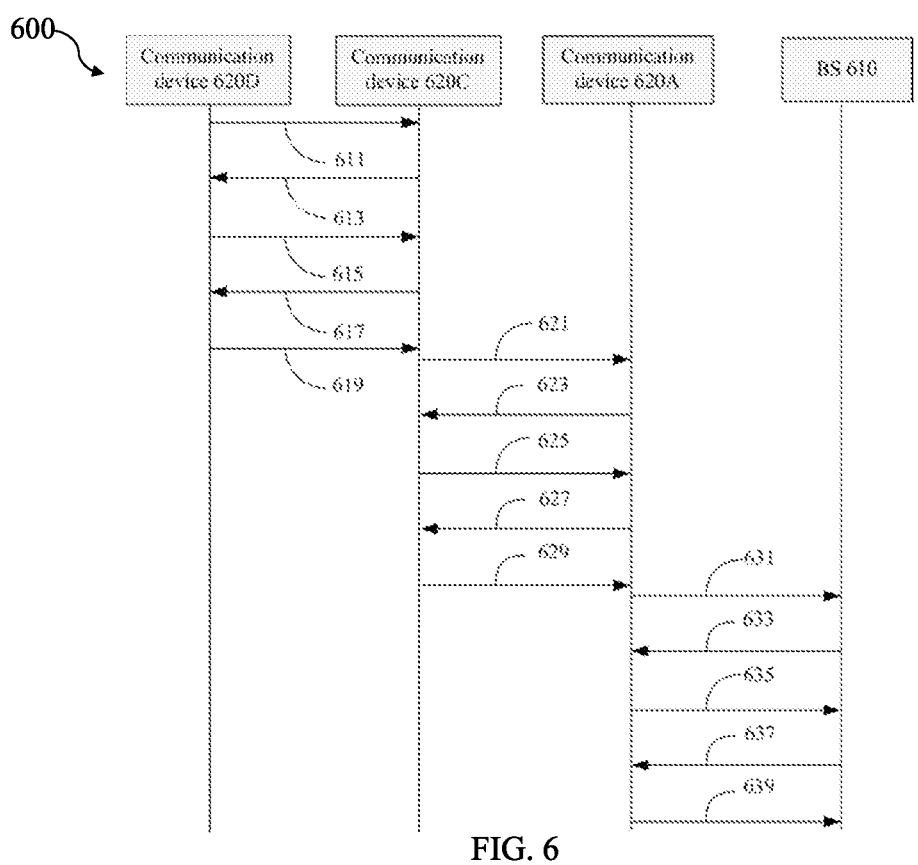
FIG. 6 illustrates a flow chart of an exemplary procedure of handling UL transmission according to some embodiments of the present disclosure.

FIG. 6 illustrates a flow chart of an exemplary procedure 600 of handling UL transmission according to some embodiments of the present disclosure.

In FIG. 6, communication device 620D can reach BS 610 by hopping through communication device 620C and communication device 620A.

In some examples, the communication device 620A may function as the IAB node 220A shown in FIG. 2, the communication device 620C may function as the IAB node 220C shown in FIG. 2, the communication device 620D may function as the IAB node 220D or the UE 230 shown in FIG. 2, and the BS 610 may function as the IAB Donor 210 shown in FIG. 2.

In some examples, the communication device 620A may function as the IAB node 420A shown in FIG. 4, the communication device 620C may function as the IAB node 420C shown in FIG. 4, the communication device 620D may function as the IAB node 420D or the UE 430 shown in FIG. 4, and the BS 610 may function as the IAB Donor 410 shown in FIG. 4.

Referring to FIG. 6, in operation 611, communication device 620D may transmit a SR to its parent node (e.g., the communication device 620C), when it has UL data to transmit. In some embodiments of the present disclosure, multi-connectivity may be configured for the communication device 620D. In these embodiments, the communication device 620D may have two or more parent nodes, and a SR may be transmitted to at least one of the two or more parent nodes, depending on, for example, the UL data to be transmitted.

In operation 613, the communication device 620D may receive a UL grant from the communication device 620C for UL transmission.

In operation 615, the communication device 620D may transmit a Buffer Status Report (BSR) to the communication device 620C. The communication device 620C may allocate uplink resource for subsequent data transmission from communication device 620D.

In operation 617, the communication device 620C may transmit to the communication device 620D an UL grant for subsequent data transmission from communication device 620D. In operation 619, the communication device 620D may transmit UL data to communication device 620C with the uplink resource allocated by communication device 620C.

After receiving UL transmission from a child communication device (e.g. the communication device 620D), the communication device 620C may perform a similar UL scheduling as described above with respect to operations 611-619.

For example, in operation 621, the communication device 620C may transmit a SR to its parent node (e.g., the communication device 620A). In some embodiments of the present disclosure, the communication device 620C may have two or more parent nodes and a SR may be transmitted to at least one of the two or more parent nodes.

In operation 623, the communication device 620C may receive an UL grant from the communication device 620A for the UL data transmission.

In operation 625, the communication device 620C may transmit a BSR to the communication device 620A. The communication device 620A may allocate uplink resource for subsequent data transmission from the communication device 620C.

In operation 627, the communication device 620A may transmit to the communication device 620C an UL grant for the subsequent data transmission from the communication device 620C.

In operation 629, the communication device 620C may transmit UL data to the communication device 620A with the uplink resource allocated by the communication device 620A.

After receiving an UL data transmission from a child communication device (e.g., the communication device 620C), the communication device 620A may perform a similar UL scheduling as described above with respect to operations 611-619 and operations 621-629.

For example, in operation 631, the communication device 620A may transmit a SR to its parent node (e.g., the BS 610). In some embodiments of the present disclosure, the communication device 620A may have two or more parent nodes, and the SR may be transmitted to at least one of the two or more parent nodes.

In operation 633, the communication device 620A may receive an UL grant from the BS 610 for UL data transmission.

In operation 635, the communication device 620A may transmit a BSR to the BS 610. The BS 610 may allocate uplink resource for subsequent data transmission from the communication device 620A.

In operation 637, the BS 610 may transmit to the communication device 620A an UL grant for subsequent data transmission from the communication device 620A.

In operation 639, the communication device 620A may transmit an UL data to the BS 610 with the uplink resource allocated by the BS 610.

In some embodiments of the present disclosure, when there are available UL resources (e.g., Physical Uplink Shared Channel (PUSCH) resources) for a communication device to send a BSR, a SR may be cancelled. In this scenario, operations 611, 613, 621, 623, 631 and 633 described above may be cancelled.

When there are no available UL resources for the communication device to send the BSR, the SR will be sent to the parent node of the communication device to require the parent node to allocate resources for the communication device, as described above with respect to operations 611, 613, 621, 623, 631 and 633.

In the exemplary procedure 600 shown in FIG. 6, a parent node may transmit a BSR or SR to its parent node after the parent node receives UL data from its child node. Such BSR or SR may be hereinafter referred to as BSR, regular BSR, SR, or regular SR.

Another solution for handling UL data transmission is to transmit a BSR or an SR before the parent node receives the UL data from its child node, which may reduce latency resulted from UL scheduling. For example, in some embodiments of the present disclosure, the parent node may transmit the BSR or the SR after it receives an SR or a BSR from its child node. In some embodiments of the present disclosure, the parent node may transmit the BSR after it transmits an UL grant to its child node. Such BSR and SR that are transmitted before the reception of the UL data from the child node are hereinafter referred to as a Pre-emptive BSR (Pre-BSR) or a Pre-emptive SR (Pre-SR), respectively. The UL scheduling procedure employing the Pre-BSR or the Pre-SR will be described in detail in the following text with respect to FIG. 7.

Figure 7:
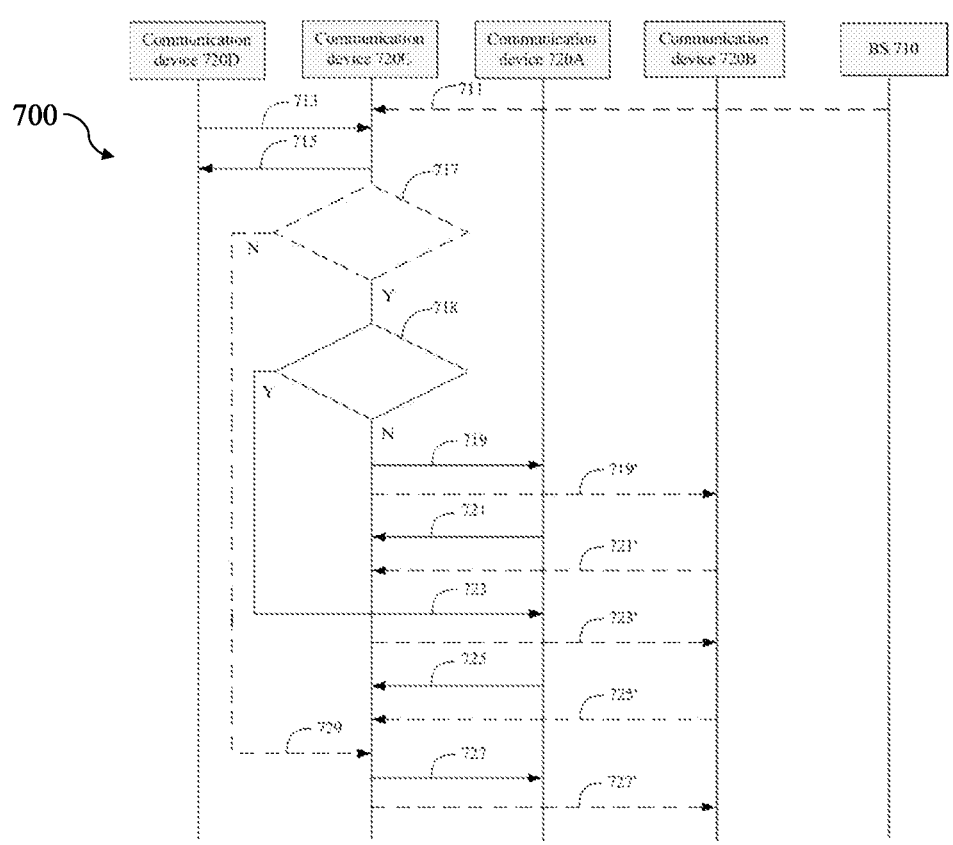
FIG. 7 illustrates a flow chart of an exemplary procedure of handling UL transmission according to some embodiments of the present disclosure.

FIG. 7 illustrates a flow chart of an exemplary procedure 700 of handling UL transmission according to some embodiments of the present disclosure.

In FIG. 7, multi-connectivity may be configured for a communication device 720C. A communication device 720C can reach a BS 710 by hopping through a communication device 720A (route E: BS710↔communication device 720A↔communication device 720C). The communication device 720C can also reach the BS 710 by hopping through the communication device 720B (route F: BS710↔communication device 720B↔communication device 720C). In other words, the communication device 720A and the communication device 720B share a child node, e.g. the communication device 720C. A communication device 720D is a child node of the communication device 720C.

In some examples, the communication device 720A may function as the IAB node 220A shown in FIG. 2, the communication device 720B may function as the JAB node 220B shown in FIG. 2, the communication device 720C may function as the JAB node 220C shown in FIG. 2, the communication device 720D may function as the JAB node 220D or the UE 230 shown in FIG. 2, and the BS 710 may function as the JAB Donor 210 shown in FIG. 2.

Although the communication device 720A and the communication device 720B are connected to the same BS, e.g. the BS 710, in FIG. 7, the communication device 720A and the communication device 720B may be connected to different BSs in accordance with some embodiments of the present disclosure.

In operation 711, the communication device 720C may receive configuration information for triggering the transmission of a Pre-BSR. In some embodiments of the present disclosure, the configuration information may indicate at least one Backhaul (BH) RLC Logical Channel Group (LCG).

In some embodiments of the present disclosure, the configuration information may include information for triggering the transmission of a Pre-SR. In some embodiments of the present disclosure, the configuration information may indicate at least one BH RLC DRB, at least one BH LCG, or any combination thereof.

In some embodiments of the present disclosure, a Pre-BSR and a Pre-SR may be applied to all UE DRBs. In these embodiments, operation 711 described above may be cancelled.

In operation 713, the communication device 720C may receive an SR or a BSR from a child node (e.g. the communication device 720D).

In operation 715, the communication device 720C may transmit an UL grant to the communication device 720D. After transmitting the UL grant, the communication device 720C may determine, in operation 717 (denoted by a dotted line as an option), whether a triggering condition for transmitting a Pre-BSR or a Pre-SR is met. The triggering condition may be configured by the BS via configuration information described above with respect to operation 711.

In some embodiment of the present disclosure, the triggering condition may not be applied to communication device 720C. In other words, operation 717 described above may be eliminated, and the communication device 720C may transmit a Pre-BSR or a Pre-SR in any case.

If the communication device 720C determines that a triggering condition for transmitting a Pre-BSR or a Pre-SR is not met, procedure 700 may go to operation 729, waiting for UL data from communication device 720D. If communication device 720C determines that a triggering condition for transmitting a Pre-BSR or a Pre-SR is met or the triggering condition does not apply, procedure 700 may go to operation 718.

In operation 718, the communication device 720C may determine whether to transmit a Pre-BSR or a Pre-SR. In some embodiment of the present disclosure, communication device 720C may determine whether there is UL resource available for Pre-BSR transmission. If the UL resource is available for the Pre-BSR transmission, procedure 700 may go to operation 723. Otherwise, if there is no UL resource available for the Pre-BSR transmission, procedure 700 may go to operation 719.

In some embodiments of the present disclosure, one or more route from a communication device to the corresponding BS(s) may be active. Pre-BSR or Pre-SR may thus need to be transmitted to at least one parent node of the communication device. For example, in some embodiment of the present disclosure, both route E and route F may be active at the communication device 720C. The communication device 720C may transmit Pre-BSR or Pre-SR to at least one parent node of the communication device 720C.

For example, the communication device 720C may, in operation 719, transmit a Pre-SR to the communication device 720A, which may, in operation 721, transmit an UL grant in response. In some examples, the communication device 720C may, in operation 719' (denoted by a dotted line as an option), transmit a Pre-SR to the communication device 720B, which may, in operation 721' (denoted by a dotted line as an option), transmit an UL grant in response.

In some examples, communication device 720C may, in operation 723, transmit a Pre-BSR to communication device 720A, which may, in operation 725, transmit a UL grant in response. In some examples, communication device 720C may, in operation 723' (denoted by a dotted line as an option), transmit a Pre-BSR to communication device 720B, which may, in operation 725' (denoted by a dotted line as an option), transmit a UL grant in response.

In operation 727, the communication device 720C may transmit an UL data to communication device 720A based on the UL grant received in operation 725. In operation 727' (denoted by a dotted line as an option), the communication device 720C may transmit an UL data to communication device 720B based on the UL grant received in operation 725'.

Certain criteria may be employed to determine whether Pre-SR or Pre-BSR is transmitted to one parent device or more than one parent devices. There criteria may be applied to procedure 700 to determine, for example, whether one or more of operation 719 and operation 719' should be performed, or whether one or more of operation 723 and operation 723' should be performed. Such criteria will be described in detail in the following text.

In some embodiment of the present disclosure, ingress logical channels of a communication device associated with the same LCG may be mapped to the same egress LCG. In these embodiments, the communication device may transmit a Pre-BSR to one of its parent node(s), which serves the communication device.

In some embodiment of the present disclosure, ingress logical channels of a communication device associated with the same LCG may be mapped to different egress LCGs. In these embodiments, the communication device may transmit a Pre-BSR to each of its parent node(s).

In some embodiment of the present disclosure, a SR (including Pre-SR) may be configured to be associated with one LCG. In some embodiment of the present disclosure, ingress logical channels of a communication device associated with the same LCG are mapped to the same egress LCG. In some embodiment of the present disclosure, a SR (including Pre-SR) may be configured to be associated with one LCG and ingress logical channels of a communication device associated with the same LCG are mapped to the same egress LCG. In the above embodiments, the communication device may transmit a Pre-SR to one of its parent nodes, which serves the communication device.

In some embodiment of the present disclosure, a SR (including Pre-SR) may be configured to be associated with one logical channel. In these embodiments, the communication device may transmit a Pre-SR to each of its parent nodes.

Other criteria for determining the target(s) of a Pre-SR or a Pre-BSR transmission may also be employed. These criteria may be employed alone or in any combination thereof.

In some embodiment of the present disclosure, a Pre-BSR may be transmitted in a similar manner as a regular BSR via a MAC unit. For example, a Pre-BSR may be included in a MAC CE of a MAC Protocol Data Unit (PDU). In these embodiments, information or data may be included in the MAC header of the MAC PDU to indicate the MAC CE including a Pre-BSR. For example, in the MAC header of a MAC PDU, there may be one corresponding field (e.g., Logical Channel ID (LCID) field) indicating the type of the Pre-BSR. The type of the Pre-BSR may be one of a short BSR, a long BSR, a short truncated BSR and a long truncated BSR. The formats for MAC PDU are defined in 3GPP specification TS 38.321.

In some embodiment of the present disclosure, a communication device may be triggered to transmit a Pre-BSR in response to, for example, transmitting an UL grant to one (e.g., a first child node) of its child nodes. Before the communication device transmits the Pre-BSR, the communication device may further receive a BSR from at least one other child node (e.g., a second child node). A node that has been allocated with UL resource (e.g., the first child node) is hereinafter referred to as "UL-grant-allocated node." A node that has not been allocated with UL resource (e.g., the second child node) is hereinafter referred to as "non-UL-grant-allocated node."

Distinguishing buffer status (a second type of buffer status) associated with a non-UL-grant-allocated node (e.g., the second child node) from buffer status (a first type of buffer status) associated with a UL-grant-allocated node (e.g., the first child node) in a Pre-BSR would be beneficial. This is because by differentiating a second type of buffer status from a first type of buffer status, the node which receives the Pre-BSR may immediately allocate UL resource for UL-grant-allocated node, and may allocate UL resource for non-UL-grant-allocated node at a later time. This may avoid UL resource being allocated at a time earlier than the arrival of UL data, which may waste UL resources. The formats of the MAC CE for a Pre-BSR, which can provide the above differentiation, will be described in detail in the following text with respect to FIGS. 8A-9B.

FIGS. 8A-9B illustrate exemplary formats of MAC CE according to embodiments of the present disclosure.

Figure 8A:
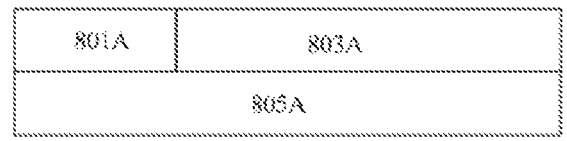
FIG. 8A illustrates an exemplary MAC control element according to some embodiments of the present disclosure.

FIG. 8A illustrates an exemplary MAC CE 800A structure according to some embodiments of the present disclosure. As shown in FIG. 8A, the MAC CE 800A structure can be octet aligned. The MAC CE 800A can include 2 bytes, which can be respectively referred to as "Oct 1" and "Oct 2" in FIG. 8A. It is contemplated that the MAC CE 800A can have structure different from the structure as illustrated in FIG. 8A. For example, the "Oct 1" as shown in FIG. 8A may include more or less bit(s) in accordance with some other embodiments of the present disclosure.

The MAC CE 800A structure may include fields 801A, 803A and 805A. The fields 801A and 803A may be used to indicate buffer status information associated with a UL-grant-allocated node, and the field 805A may be used to indicate buffer status information associated with at least one non-UL-grant-allocated node.

Assuming that the field 801A has 3 bits, which can be used to indicate an identity of a logical channel group whose buffer status is being reported. It is contemplated that in accordance with some other embodiments of the present disclosure, the field 801A can be assigned with more or less bit(s) to indicate a logical channel group whose buffer status is being reported. It is contemplated that in accordance with some other embodiments of the present disclosure, all the bits in the field 801A can be used to indicate a logical channel group whose buffer status is being reported. It is contemplated that in accordance with some other embodiments of the present disclosure, some of the bits in the field 801A can be used to indicate a logical channel group whose buffer status is being reported.

Assuming that the field 803A has 5 bits, which can be used to indicate buffer size information for the logical channel group identified by the field 801A. It is contemplated that in accordance with some other embodiments of the present disclosure, the field 803A can be assigned with more or less bit(s) to indicate buffer size information for the logical channel group identified by the field 801A. It is contemplated that in accordance with some other embodiments of the present disclosure, all the bits in the field 803A can be used to indicate buffer size information for the logical channel group identified by the field 801A. It is contemplated that in accordance with some other embodiments of the present disclosure, some of the bits in the field 803A can be used to indicate buffer size information for the logical channel group identified by the field 801A.

In some embodiments, the field 801A may comprise an LCG ID and the field 803A may indicate the Buffer Size defined in 3GPP specification TS 38.321.

Assuming that the field 805A has one byte (or 8 bits), all 8 bits of the field 805A may be used to indicate a total Buffer Size of at least one non-UL-grant-allocated node. In some other embodiments of the present disclosure, only some of the bits of the field 805A may be used to indicate a total Buffer Size of at least one non-UL-grant-allocated node. It is contemplated that in accordance with some other embodiments of the present disclosure, the field 805A can include more or less bit(s).

In some embodiments of the present disclosure, the field 805A may include two sub-fields (not shown in FIG. 8A). One of the sub-fields, which is assumed to include 5 bits for example, may be used to indicate the total Buffer Size of at least one non-UL-grant-allocated node. The other sub-field, which is assumed to include 3 bits for example, may be used to indicate time information for the at least one non-UL-grant-allocated node and may include 3 bits. The node which receives the Pre-BSR may allocate an UL grant for the at least one non-UL-grant-allocated node based on the time information. The time information may allow the node which receives the Pre-BSR to allocation an UL resource for non-UL-grant-allocated node at a more accurate time.

Figure 8B:
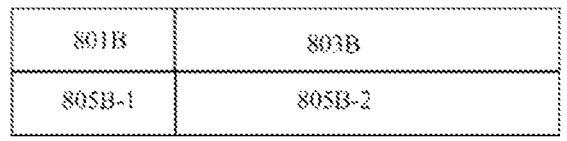
FIG. 8B illustrates an exemplary MAC control element according to some embodiments of the present disclosure.

FIG. 8B illustrates an exemplary MAC CE 800B structure according to some embodiments of the present disclosure. As shown in FIG. 8B, the MAC CE 800B structure can be octet aligned. The MAC CE 800B can include 2 bytes, which can be respectively referred to as "Oct 1" and "Oct 2" in FIG. 8B. It is contemplated that the MAC CE 800B can have structure different from the structure as illustrated in FIG. 8B. For example, the "Oct 1" as shown in FIG. 8B may include more or less bit(s) in accordance with some other embodiments of the present disclosure.

The MAC CE 800B structure may include fields 801B, 803B, 805B-1 and 805B-2. The fields 801B and 803B may be used to indicate a buffer status information associated with an UL-grant-allocated node. The configuration of the fields 801B and 803B may be similar to those described with respect to the fields 801A and 803A in FIG. 8A, and thus is omitted herein. The fields 805B-1 and 805B-2 may be used to indicate buffer status information associated with at least one non-UL-grant-allocated node.

Assuming that the field 805B-1 has 3 bits, which can be used to indicate the at least one non-UL-grant-allocated node. It is contemplated that in accordance with some other embodiments of the present disclosure, the field 805B-1 can be assigned with more or less bit(s) to indicate the at least one non-UL-grant-allocated node. It is contemplated that in accordance with some other embodiments of the present disclosure, all the bits in the field 805B-1 can be used to indicate the at least one non-UL-grant-allocated node. It is contemplated that in accordance with some other embodiments of the present disclosure, some of the bits in the field 805B-1 can be used to indicate the at least one non-UL-grant-allocated node.

In some embodiments, the field 805B-1 may indicate the group of logical channels whose buffer status is being report. For example, the field 805B-1 may comprise an LCG ID of the group of logical channels whose buffer status is being reported.

Assuming that the field 805B-2 has 5 bits, which can be used to indicate a buffer size information of a group of logical channels identified by the field 805B-1. It is contemplated that in accordance with some other embodiments of the present disclosure, the field 805B-2 can be assigned with more or less bit(s) to indicate buffer size information for the group of logical channels identified by the field 805B-1. It is contemplated that in accordance with some other embodiments of the present disclosure, all the bits in the field 805B-2 can be used to indicate buffer size information for the group of logical channels identified by the field 805B-1. It is contemplated that in accordance with some other embodiments of the present disclosure, some of the bits in the field 805B-2 can be used to indicate buffer size information for the group of logical channels identified by the field 805B-1.

In some embodiments, similar to the field 805A in FIG. 8A, the field 805B-2 may include two sub-fields (not shown in FIG. 8B), which are used to indicate the buffer size information and the time information for the at least one non-UL-grant-allocated node, respectively.

Figure 9A:
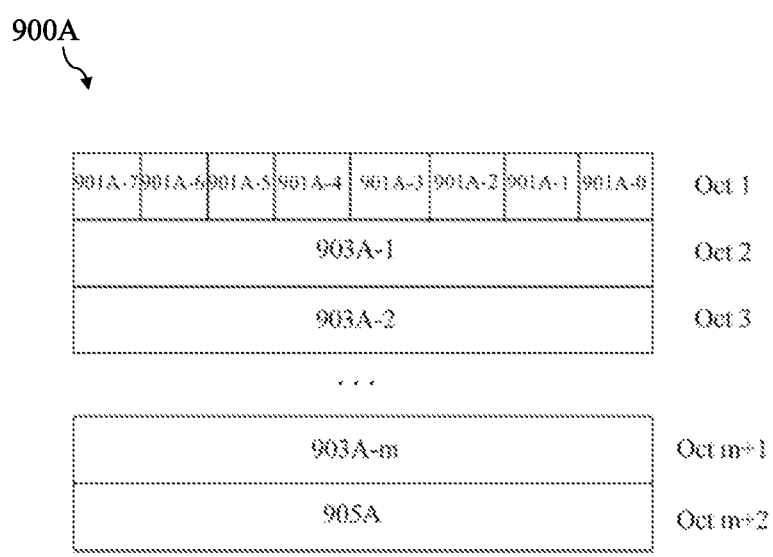
FIG. 9A illustrates an exemplary MAC control element according to some embodiments of the present disclosure.

FIG. 9A illustrates an exemplary MAC CE 900A structure according to some embodiments of the present disclosure. As shown in FIG. 9A, the MAC CE 900A structure can be octet aligned. The MAC CE 900A can include m+2 bytes. The first, second, and third bytes can be respectively referred to as "Oct 1," "Oct 2," and "Oct 3" in the figure. The last two bytes can be respectively referred to as "Oct m+1" and "Oct m+2" in FIG. 9A. It is contemplated that the MAC CE 900A can have structure different from the structure as illustrated in FIG. 9A. For example, the "Oct 1" as shown in FIG. 9A may include more or less bit(s) in accordance with some other embodiments of the present disclosure.

The MAC CE 900A structure may include fields 901A-0 to 901A-7, fields 903A-1 to 903A-m, and field 905A. The fields 901A-0 to 901A-7 and the fields 903A-1 to 903A-m may be used to indicate buffer status information associated with UL-grant-allocated node(s). The field 905A may be used to indicate buffer status information associated with at least one non-UL-grant-allocated node.

Assuming that each of fields 901A-0 to 901A-7 has 1 bit, which be used to indicate the presence of the buffer size information field for a corresponding LCG. It is contemplated that in accordance with some other embodiments of the present disclosure, each of the fields 901A-0 to 901A-7 can be assigned with more bits to indicate the presence of the buffer size information field for a corresponding LCG. It is contemplated that in accordance with some other embodiments of the present disclosure, all the bits in each of the fields 901A-0 to 901A-7 can be used to indicate the presence of the buffer size information field for a corresponding LCG. It is contemplated that in accordance with some other embodiments of the present disclosure, some of the bits in each of the fields 901A-0 to 901A-7 can be used to indicate the presence of the buffer size information field for a corresponding LCG.

For example, field 901A-i (i=0~7) may be set to "1" to indicate that the buffer size information field for logical channel group i is included in a corresponding one of the fields 903A-1 to 903A-m of the MAC CE structure. Field 901A-i (i=0~7) may be set to "0" to indicate that the buffer size information field for logical channel group i is not included in the MAC CE structure. In some embodiments, fields 901A-0 to 901A-7 may correspond to $LCG_i$ field defined in 3GPP specification TS 38.321 and fields 903A-1 to 903A-m may correspond to Buffer Size field defined in 3GPP specification TS 38.321.

Assuming that the field 905A has 8 bits, all 8 bits of the field 905A may be used to indicate a total Buffer Size of at least one non-UL-grant-allocated node. In some other embodiments of the present disclosure, only some of the bits of the field 905A may be used to indicate a total Buffer Size of at least one non-UL-grant-allocated node. It is contemplated that in accordance with some other embodiments of the present disclosure, the field 905A can include more or less bit(s).

In some embodiments of the present disclosure, similar to the field 805A in FIG. 8A and 805B-2 in FIG. 8B, the field 905A may include two sub-fields (not shown in FIG. 9A). One of the sub-fields, which is assumed to include 5 bits for example, may be used to indicate the total Buffer Size of at least one non-UL-grant-allocated node The other sub-field, which is assumed to include 3 bits for example, may be used to indicate time information for the at least one non-UL-grant-allocated node. The node which receives the Pre-BSR may allocate an UL grant for the at least one non-UL-grant-allocated node based on the time information.

Figure 9B:
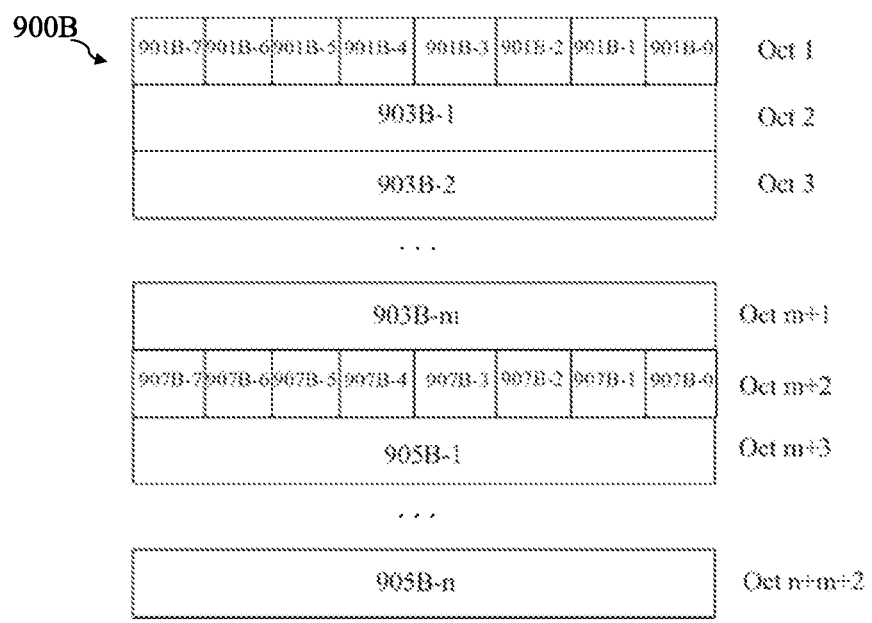
FIG. 9B illustrates an exemplary MAC control element according to some embodiments of the present disclosure.

FIG. 9B illustrates an exemplary MAC CE 900B structure according to some embodiments of the present disclosure. As shown in FIG. 9B, the MAC CE 900B structure can be octet aligned. The MAC CE 900B can include n+m+2 bytes. The first, second, and third bytes can be respectively referred to as "Oct 1," "Oct 2," and "Oct 3" in FIG. 9B. The last byte can be referred to as "Oct n+m+2" in FIG. 9B. Some intermediate bytes can be respectively referred to as "Oct m+1," "Oct m+2," and "Oct m+3" in FIG. 9B. It is contemplated that the MAC CE 900B can have structure different from the structure as illustrated in FIG. 9B. For example, the "Oct 1" as shown in FIG. 9B may include more or less bit(s) in accordance with some other embodiments of the present disclosure.

The MAC CE 900B structure may include fields 901B-0 to 901B-7, fields 903B-1 to 903B-m, fields 907B-0 to 907B-7, and fields 905B-1 to 905B-n. The fields 901B-0 to 901B-7 and the fields 903B-1 to 903B-m may be used to indicate buffer status information associated with UL-grant-allocated node(s). The fields 907B-0 to 907B-7 and the fields 905B-1 to 905B-n may be used to indicate buffer status information associated with at least one non-UL-grant-allocated node.

The configuration of the fields 901B-0 to 901B-7 and the fields 903B-1 to 903B-m may be similar to those described with respect to the fields 901A-0 to 901A-7 and the fields 903A-1 to 903A-m in FIG. 9A, and thus is omitted herein.

Assuming that each of the fields 907B-0 to 907B-7 has 1 bit, which can be used to indicate a respective one of at least one non-UL-grant-allocated node. In some embodiments, each of the fields 907B-0 to 907B-7 may be used to indicate the presence of the buffer size information field for a corresponding LCG of a non-UL-grant-allocated node. It is contemplated that in accordance with some other embodiments of the present disclosure, each of the fields 907B-0 to 907B-7 can be assigned with more bits to indicate the presence of the buffer size information field for a corresponding LCG of a non-UL-grant-allocated node. It is contemplated that in accordance with some other embodiments of the present disclosure, all the bits in each of the fields 907B-0 to 907B-7 can be used to indicate the presence of the buffer size information field for a corresponding LCG of a non-UL-grant-allocated node. It is contemplated that in accordance with some other embodiments of the present disclosure, some of the bits in each of the 907B-0 to 907B-7 can be used to indicate the presence of the buffer size information field for a corresponding LCG of a non-UL-grant-allocated node.

For example, the fields 907B-i (i=0~7) may be set to "1" to indicate that the buffer size information field for logical channel group i is included in the MAC CE structure. The fields 907B-i (i=0~7) may be set to "0" to indicate that the buffer size information field for logical channel group i is not included in the MAC CE structure. Each of the fields 905B-1 to 905B-n may be used to indicate a buffer size information field of a corresponding LCG of a non-UL-grant-allocated node.

In some embodiments of the present disclosure, the configuration of fields 907B-0 to 907B-7 may correspond to the configuration of $LCG_i$ field defined in 3GPP specification TS 38.321, and the configuration of field 905B-1 to 905B-n may correspond to the configuration of Buffer Size field defined in 3GPP specification TS 38.321.

In some embodiments of the present disclosure, similar to the field 805A in FIG. 8A, 805B-2 in FIG. 8B, and 905A in FIG. 9A, each of the fields 905B-1 to 905B-n may be used to indicate both the buffer size information and the time information for a respective one of at least one non-UL-grant-allocated node.

For example, each of the fields 905B-1 to 905B-n may include two sub-fields (not shown in FIG. 9B). One of the sub-fields, which is assumed to include 5 bits for example, may be used to indicate buffer size information of a corresponding one of the at least one non-UL-grant-allocated node. The other sub-field, which is assumed to include 3 bits for example, may be used to indicate a respective time information of the corresponding one non-UL-grant-allocated node. The node which receives the Pre-BSR may allocate an UL grant for the at least one non-UL-grant-allocated node based on the time information.

The arrangements of fields of the exemplary MAC CEs in FIG. 8A-9B are intended to be illustrative, not limiting. Various modifications to the arrangements of fields in FIG. 8A-9B are readily apparent to persons skilled in the art.

Figure 10:
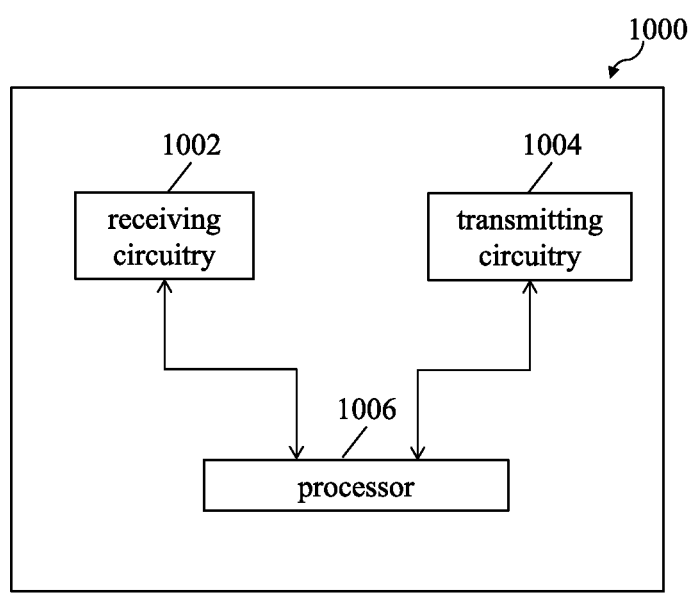
FIG. 10 illustrates an example block diagram of an apparatus according to some embodiments of the present disclosure.

FIG. 10 illustrates an example block diagram of an apparatus 1000 according to some embodiments of the present disclosure.

As shown in FIG. 10, the apparatus 1000 may include at least one non-transitory computer-readable medium (not illustrated in FIG. 10), a receiving circuitry 1002, a transmitting circuitry 1004, and a processor 1006 coupled to the non-transitory computer-readable medium (not illustrated in FIG. 10), the receiving circuitry 1002 and the transmitting circuitry 1004. The apparatus 1000 may be a BS or a communication device (e.g., an IAB node or an UE).

Although in this figure, elements such as processor 1006, transmitting circuitry 1004, and receiving circuitry 1002 are described in the singular, the plural is contemplated unless limitation to the singular is explicitly stated. In some embodiments of the present disclosure, the receiving circuitry 1002 and the transmitting circuitry 1004 are combined into a single device, such as a transceiver. In certain embodiments of the present disclosure, the apparatus 1000 may further include an input device, a memory, and/or other components.

In some embodiments of the present disclosure, the non-transitory computer-readable medium may have stored thereon computer-executable instructions to cause a processor to implement the method with respect to the communication device as described above. For example, the computer-executable instructions, when executed, cause the processor 1006 interacting with receiving circuitry 1002 and transmitting circuitry 1004, so as to perform the steps with respect to the IAB nodes and UEs depicted in FIGS. 2 and 4 and the communication devices depicted in FIGS. 3 and 5-7.

In some embodiments of the present disclosure, the non-transitory computer-readable medium may have stored thereon computer-executable instructions to cause a processor to implement the method with respect to the BS as described above. For example, the computer-executable instructions, when executed, cause the processor 1006 interacting with receiving circuitry 1002 and transmitting circuitry 1004, so as to perform the steps with respect to the IAB donors depicted in FIGS. 2 and 4 and the BSs depicted in FIGS. 3 and 5-7.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including".

The following is what is claimed:

1. A method performed by a third communication device, the method comprising:
    forwarding, from a first protocol stack of the third communication device associated with a first communication device, information associated with a failed backhaul link between the first communication device and the third communication device to a second protocol stack of the third communication device associated with a second communication device;
    transmitting a signaling message to a base station on a backup backhaul route, wherein the signaling message comprises an indication of the failed backhaul link between the first communication device and the third communication device, and wherein the indication of the failed backhaul link is transmitted during a message 3 of a random access procedure (RACH); and
    in response to transmitting the signaling message, receiving a reconfiguration message from the base station to reconfigure the third communication device.

2. The method of claim 1, wherein the signaling message comprises a radio resource control (RRC) signaling message.

3. The method of claim 1, wherein the signaling message comprises a media access control (MAC) control element (CE) signaling message.

4. The method of claim 1, further comprising:
    forwarding, from a first protocol stack associated with the failed backhaul link, pending data in a buffer of the first protocol stack and assistant information to a second protocol stack associated with the backup backhaul route.

5. The method of claim 1, further comprising:
    forwarding, from a first protocol stack associated with the failed backhaul link, assistant information to a second protocol stack associated with the backup backhaul route.

6. A base station, comprising:
    at least one memory; and
    at least one processor coupled with the at least one memory and configured to cause the base station to:
        receive a signaling message from a third communication device on a backup backhaul route, wherein the signaling message comprises an indication of a failed backhaul link between a first communication device and the third communication device, and wherein the indication of the failed backhaul link is transmitted during a message 3 of a random access procedure (RACH); and
        in response to receiving the signaling message, transmit a reconfiguration message to the third communication device to reconfigure the third communication device.

7. The base station of claim 6, wherein the signaling message comprises a radio resource control (RRC) signaling message.

8. The base station of claim 6, wherein the signaling message comprises a media access control (MAC) control element (CE) signaling message.

9. The base station of claim 6, wherein the at least one processor is configured to cause the base station to receive data associated with the failed backhaul link.

10. The base station of claim 9, wherein the data comprises a packet data convergence protocol (PDCP) packet which has not been acknowledged by one of two nodes which terminate the backhaul link.

11. The base station of claim 6, wherein the at least one processor is configured to cause the base station to receive assistant information associated with the failed backhaul link.

12. The base station of claim 11, wherein the assistant information comprises a PDCP status report.

13. A third communication device, comprising:
    at least one memory; and
    at least one processor coupled with the at least one memory and configured to cause the third communication device to:
        forward, from a first protocol stack of the third communication device associated with a first communication device, information associated with a failed backhaul link between the first communication device and the third communication device to a second protocol stack of the third communication device associated with a second communication device;

transmit a signaling message to a base station on a backup backhaul route, wherein the signaling message comprises an indication of the failed backhaul link between the first communication device and the third communication device, and wherein the indication of the failed backhaul link is transmitted during a message 3 of a random access procedure (RACH); and in response to transmitting the signaling message, receive a reconfiguration message from the base station to reconfigure the third communication device.

14. The third communication device of claim 13, wherein the signaling message comprises a radio resource control (RRC) signaling message.

15. The third communication device of claim 13, wherein the signaling message comprises a media access control (MAC) control element (CE) signaling message.

16. A method performed by a base station, the method comprising:

receiving a signaling message from a third communication device on a backup backhaul route, wherein the signaling message comprises an indication of a failed backhaul link between a first communication device and the third communication device, and wherein the indication of the failed backhaul link is transmitted during a message 3 of a random access procedure (RACH); and in response to receiving the signaling message, transmitting a reconfiguration message to the third communication device to reconfigure the third communication device.

17. The method of claim 16, wherein the signaling message comprises a radio resource control (RRC) signaling message.

18. The method of claim 16, wherein the signaling message comprises a media access control (MAC) control element (CE) signaling message.

19. The method of claim 16, wherein further comprising receiving data associated with the failed backhaul link.

20. The method of claim 19, wherein the data comprises a packet data convergence protocol (PDCP) packet which has not been acknowledged by one of two nodes which terminate the backhaul link.

* * * * *